United States Patent
Valys

(10) Patent No.: US 6,549,914 B1
(45) Date of Patent: Apr. 15, 2003

(54) SYSTEM AND METHOD FOR STATISTICAL FILE PRELOAD FOR FACTORY INSTALLED SOFTWARE IN A COMPUTER

(75) Inventor: David T. Valys, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 09/572,479

(22) Filed: May 17, 2000

(51) Int. Cl.[7] .............................................. G06F 17/30
(52) U.S. Cl. ..................... 707/104.1; 707/7; 707/10; 345/968; 717/174; 717/175
(58) Field of Search ................. 707/1, 7, 10, 104.1; 345/968; 717/174, 175, 177, 178

(56) References Cited

U.S. PATENT DOCUMENTS

| | | | |
|---|---|---|---|
| 5,923,846 A | * 7/1999 | Gage et al. ................. 709/213 |
| 6,016,400 A | 1/2000 | Day et al. .................... 717/175 |
| 6,018,780 A | * 1/2000 | Fenchel ....................... 710/105 |
| 6,026,405 A | * 2/2000 | Arda et al. .................... 707/10 |
| 6,151,643 A | * 11/2000 | Cheng et al. .................. 710/36 |
| 6,292,485 B1 | * 9/2001 | Trotta et al. ................. 370/389 |
| 6,339,785 B1 | * 1/2002 | Feigenbaum ................. 709/213 |
| 6,347,398 B1 | * 2/2002 | Parthasarathy et al. ........ 717/11 |
| 6,401,239 B1 | * 6/2002 | Miron .......................... 717/11 |

* cited by examiner

*Primary Examiner*—John Breene
*Assistant Examiner*—Cheryl Lewis
(74) *Attorney, Agent, or Firm*—Haynes and Boone, LLP

(57) ABSTRACT

A method for statistical file preload of an image in a computer system is disclosed. The method includes statistically analyzing a bandwidth requirement of computer readable files to be downloaded to a target computer during a software download portion of a computer manufacturing process. The files are ordered into an ordered list of files as a function of the analyzed bandwidth requirements. Lastly, files from the ordered list of files are selected for inclusion in a preload image as a function of a prescribed manufacturing criteria.

5 Claims, 2 Drawing Sheets

SYSTEM AND METHOD FOR STATISTICAL FILE PRELOAD FOR FACTORY INSTALLED SOFTWARE IN A COMPUTER

CROSS-REFERENCE TO CO-PENDING APPLICATIONS

This application relates to co-pending U.S. patent application Ser. No. 09/302609, pending, filed on Apr. 30, 1999, entitled "Method For Launching Generic Download Processes in a Build-To-Order Environment", naming Gaston Barajas and Todd Nix as inventors. This co-pending application is incorporated herein by reference in its entirety, and is assigned to the assignee of the present application.

This application relates to co-pending U.S. patent application Ser. No. 08/948375, U.S. Pat. No. 6,216,109, filed on Dec. 3, 1997, entitled "Technique for Performing factory Installation of Software", naming Tom Colligan and Tom John Odendahl as inventors. This co-pending application is incorporated herein by reference in its entirety, and is assigned to the assignee of the present application.

This application relates to co-pending U.S. patent application Ser. No. 09/277062, pending, filed on Mar. 26, 1999, entitled "Factory Software Management System", naming Gaston Barajas, Jon Boede, Joe Bryan, Paul Maia and Steve Romohr as inventors. This co-pending application is incorporated herein by reference in its entirety, and is assigned to the assignee of the present application.

BACKGROUND

The disclosures herein relate generally to computer systems, and more particularly, to a system and method for statistical file preload for factory installed software.

In build-to-order manufacturing of custom configured computer systems, production efficiency is one of the single most important factors affecting the bottom line. Absent efficient factory operations, a computer system manufacturer may undesirably need to construct more factories for obtaining or maintaining a prescribed production capacity, for example, in view of the ever-changing requirements of customer ordered software.

An important phase impacting the efficiency in computer build-to-order factories is software installation. The time required to install software is generally a function of a serial process along the critical path through the factory. With respect to software installation, a network generally downloads software onto target computer systems.

In addition to the above, modern application software and operating systems are regularly increasing in size, i.e., the amount of storage space (e.g., in MB or GB) that each requires. The increase in size requirements places an ever-increasing demand on the factory network infrastructure. Such increased demand further increases download times for factory installation of software on the computer systems being manufactured.

Prior methods for addressing the above problem have included building additional factories to handle the increased demands for factory software installation. Alternatively, the problem has been addressed by investing in a greater network infrastructure to increase bandwidth to the target systems. Both of these methods increase the manufacturing costs for the build-to-order computer manufacturer.

What is needed is an improved system and method for factory installed software.

SUMMARY

According to one embodiment, a method for statistical file preload of an image in a computer includes statistically analyzing an overhead or delivery requirement as a function of relevant manufacturing criteria of computer readable files to be downloaded to a target computer during a software download portion of a computer manufacturing process. Lastly, files are selected for inclusion in a preload image as a function of relevant manufacturing criteria.

A technical advantage of the embodiments of the present disclosure is an improved efficiency in the overall manufacture of custom configured computer systems, and, in particular, the software download portion.

DETAILED DESCRIPTION

Figure 1:
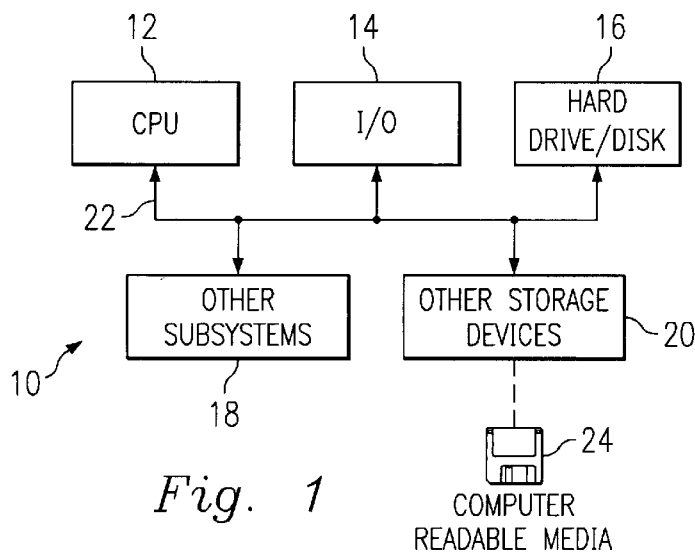
FIG. 1 illustrates a block diagram view of a computer manufactured according to one embodiment of the present disclosure.

Referring briefly to FIG. 1, a system block diagram of a computer system 10 is shown having features thereof configured in accordance with a customer configured computer system order as discussed herein. The computer system 10 includes a central processing unit (CPU) 12, input/output (I/O) devices, such as a display, a keyboard, a mouse, and associated controllers, collectively designated by a reference numeral 14, a hard disk drive 16, and other storage devices, such as a may include a floppy disk drive, CD-ROM drive, and the like, collectively designated by a reference numeral 18, and various other subsystems, such as a network interface card, collectively designated by a reference numeral 20, all interconnected via one or more buses, shown collectively as a bus 22. A computer readable media 24 (such as a floppy disk, CD-ROM, or the like) is also included.

Figure 2:
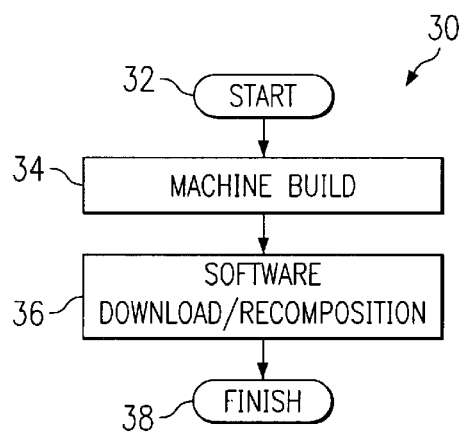
FIG. 2 illustrates a flow diagram view of one embodiment of the manufacturing process of the present disclosure.

With reference to FIG. 2, a build-to-order computer system manufacturing process 30 includes the following steps, starting at step 32. Hardware components, including a hard drive (or storage device) containing a statistical file preload image as discussed herein, are installed onto a target computer system in step 34. The particular hardware components are per a computer system order or plan. In step 36, predetermined files, which complete the configured computer system in conjunction with the statistical file preload image and recomposition instructions per a computer system order or plan, are downloaded per download instructions onto the hard drive or storage device of the target system (as further discussed herein). The predetermined files of software are per computer system order or plan, also. After the download, the downloaded files and the statistical file preload image are recomposed according to recomposition instructions, further as per a respective computer system order and further discussed herein. Subsequent to the download/recomposition step in step 38, the process finishes and/or may include testing prior to finishing.

Figure 3:
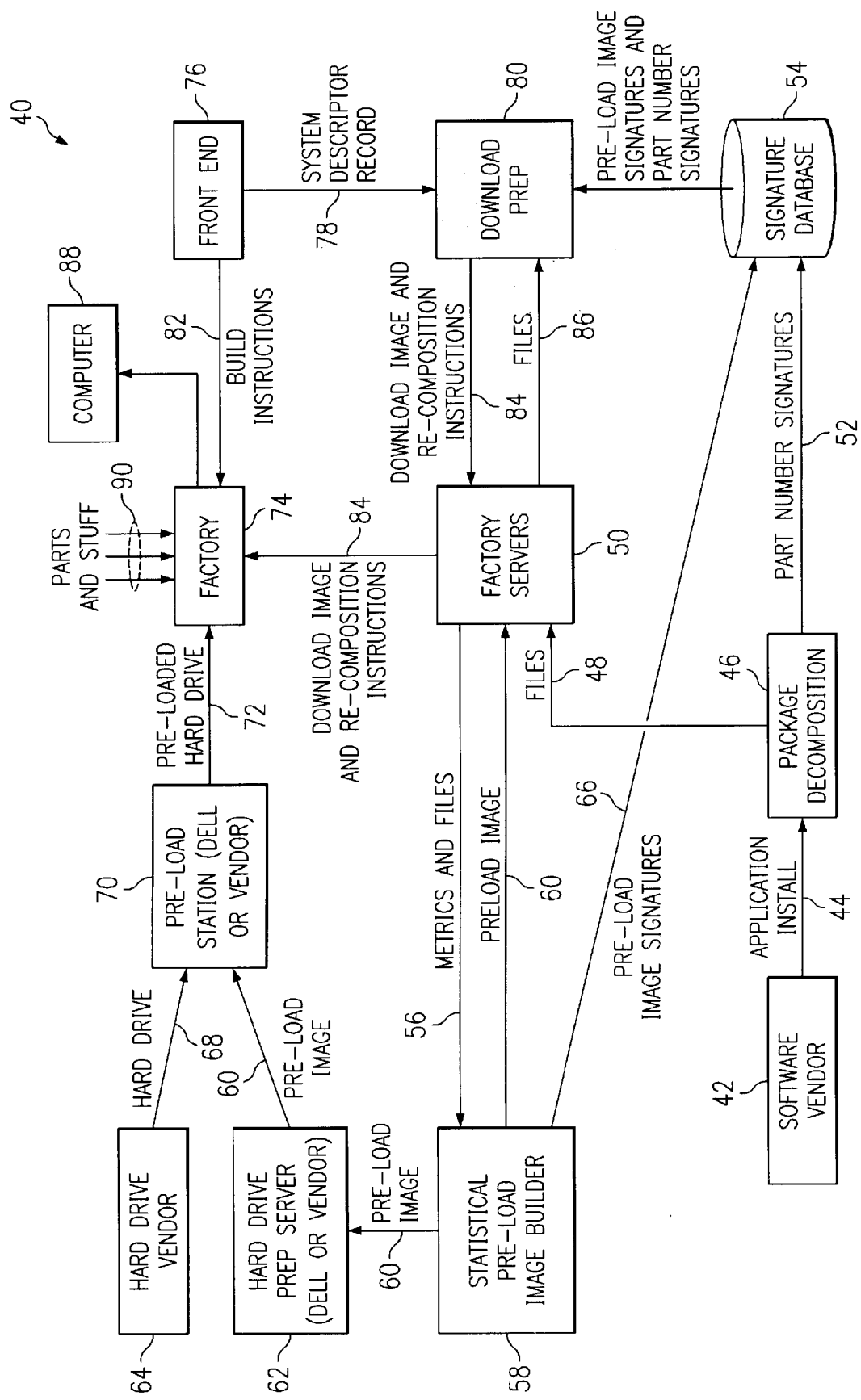
FIG. 3 illustrates a block diagram view of another embodiment of the manufacturing process of the present disclosure.

With reference now to FIG. 3, an overview of an exemplary manufacturing process 40 according to one embodiment of the present disclosure shall be discussed. To begin, a software vendor 42 delivers a new software application package, operating system, or other additional files 44 to the computer manufacturer 40 in preparation for use in a factory install. The computer manufacturer's factory prep processor or group 46 decomposes the vendor install 44 into a) files 48 to be delivered to the factory server(s) 50 and b) a signature list 52 associated with an assigned part number to be delivered to the signature database 54.

Using historical factory download metrics and files 56 that are delivered from the factory server(s) 50, a computer manufacturer statistical preload image builder 58 utilizes a set of weighting functions to determine which files should be included in a statistical file preload image 60. The statistical file preload image builder 58 provides the preload image 60 to file server(s) 50 and to a hard drive prep server 62.

After deciding which files are to be included in the statistical file preload image 60, the computer manufacturer statistical preload image builder 58 generates and delivers the statistical file preload image 60 to the factory server(s) 50 and to the hard drive prep server 62. The hard drive prep server 62 may be located at the hard drive vendor 64 or at the computer manufacturer 40. Note that the hard drive prep server 62 may also be the factory server 50. For illustration only, the hard drive vendor shall be referred to for the site of the hard drive prep server 62 in this example. For restarting failed systems, at least a small-scale version of the hard drive prep server 62 (or a fallback install method) should be provided at the computer manufacturing site 40.

Additionally, the computer manufacturer statistical preload image builder 58 generates a preload image signature list 66 and delivers it to the signature database 54.

The hard drive vendor 64 manufactures hard drives 68. The hard drives 68 are delivered to a hard drive preload station 70 which may be at the vendor site or in the computer manufacturer factory. The hard drive preload station 70 downloads the preload image 60 from the hard drive prep server 62 to the hard drive to produce the statistical file preloaded hard drive 72. The statistical file preloaded hard drive 72 is then delivered to the factory 74.

The sales front end server 76 generates a system descriptor record (SDR) 78, wherein the system descriptor record lists the software packages to be installed for a given target system. The sales front end server 76 delivers the SDR 78 to the download prep engine 80. The sales front end 76 also generates build instructions 82 and delivers the build instructions to the factory 74.

The download prep engine 80 receives the preload image signatures 66 and the part number signatures 52 called for in the system descriptor record 78. In response, the download prep engine 80 compares the preload image signatures with the part number signatures to generate the download image 84. The download image 84 contains all the remaining required files 86 as provided by the factory server(s) 50 and which are not included in the preload image 60.

In addition to the download image 84, the download prep engine 80 generates recomposition instructions. The recomposition instructions tell the install process how to combine the download image 84 and the preload image 60 into a target computer system 88. The download image 84 and the recomposition instructions are delivered to the factory server(s) 50 prior to the actual installation in connection with the target computer 88. Alternatively, if the file server can construct the download image file stream rapidly enough, then only the recomposition instructions 84 need to be generated prior to the build and the download image 84 need not be generated by the download prep engine 80 or stored on the factory servers 50.

Lastly, the factory 74, having received the preloaded hard drive 72 from the hard drive preload station 70; build instructions 82 from the front end 76; and all the remaining parts 90, downloads the recomposition instructions and download image 84 from the factory server(s) 50. Using the recomposition instructions, the factory combines the download image 84 and the preload image 60 to install the files into a desired state on the target computer system 88.

Note that the various functions of the computer servers as discussed herein can be programmed using programming techniques well known in the art.

In conjunction with the discussion of computer system manufacturing, every minute required to deliver bits to the target computer during the manufacturing process is expensive. A software download under the prior manufacturing process may consume on the order of 2½ hours whereas a software download using an embodiment of the present disclosure may be on the order of 30 minutes. As a result, approximately two hours would be saved on the throughput time for a target system according to the present embodiments. Amortized across the factory (8 hours down to 6 hours), an approximate 120% production order of magnitude is possible in the same factory by implementation of the embodiments of the present disclosure.

One consideration of the manufacturing process is that download (DNLD) time is expensive. Another consideration is that certain infrastructure requirements are needed to support a given DNLD bandwidth. Infrastructure is required to support the software download (SW DNLD) of a manufacturing process. The more bits required for a SW DNLD, the greater the infrastructure load. The infrastructure load may require faster networking, more networking cards, routers, etc. necessary to support factory SW DNLD onto hard drives of target computer systems being manufactured.

Networking infrastructure can accordingly be characterized in terms of network bandwidth. Both DNLD time and network infrastructure bandwidth are expensive. Bandwidth refers to an average number of bits required to be delivered per hour.

If the average number of bits needed to be delivered to a target system can be reduced, then the cost of manufacture for that target system can be reduced. With the present embodiments, a reduction in manufacturing cost is possible because the factory doesn't have to rent manufacturing space for so long, can produce more target systems per unit time, or can reduce a total number of manufacturing servers required. More particularly, the reduction in manufacturing cost is possible because a given percentage of required bits for a SW DNLD may already be present on the target system as a result of the statistical file preload of the present disclosure.

A goal of the statistical file preload is to put as many of the bits as practicable on the target system prior to the SW DNLD phase of the computer manufacturing process. The SW DNLD phase/process accordingly polishes off (i.e. differentiates) the image and makes sure that the image is correct for the particular target system being manufactured.

Considering image preload in general, let's look briefly at what can be done for preloading an image. One approach could include preloading bundles of SW, based upon the fact that most people order given applications together. Bundling of SW can facilitate marketing and manufacturing reasons.

Another approach would be to overinstall a preload image. The overinstall image could include all or a large portion SW offered by the computer manufacturer. During the manufacturing process, all SW not ordered by a customer would be deleted from the overinstalled image and any software missing in the image could be added. This latest method might not be practical because, given that the manufacturer may ship so many different types of SW it may be economically and/or physically impossible to put all of the types of SW onto one hard drive or storage device.

How do you choose which SW items to preload, given that putting all SW items on a hard drive may not be practical (either economically and/or physically)? In such an instance, the process could include trimming the preload image down to a reasonable size, via bundling or otherwise, however, preselect what a customer will be allowed to select together. On the other hand, if hard drive capacity is large enough, then a preload image that includes all SW items offered by the computer manufacturer may be possible, with deletion of non-ordered SW occurring during the DNLD portion of the manufacturing process. By the time a customer receives his or her target system, no evidence remains that all SW items were on the hard drive at one time during the manufacturing process.

The present embodiment includes a method for determining what SW gets preloaded onto a hard drive such that, for example, a least average number of bits get downloaded across the manufacturing network during the computer manufacturing process. The value of the present embodiments is realized in that, rather than choosing entire applications to install during the SW DNLD portion of the manufacturing process, select portions of applications are statistically preloaded.

For example, a first SW application comprises a first set of files which make up the first application. A second SW application comprises a second set of files which make up the second application. Some of the files contained in the first application are the same as some of those found in the second application. In other words, some files are common to both the first and second SW applications. In addition, some files of the first SW application are unique to the first SW application. Some files of the second SW application are unique to the second SW application.

In an effort to minimize or reduce the total number of bits in a SW DNLD phase of the manufacturing process, then equipped with a statistical sampling of customers' orders, an appropriate statistical analysis can be performed. For example, if Microsoft™ (MS) Word™ is downloaded a first number of times and MS Excel™ get downloaded a second number of times, then it may be discovered that often both MS Word™ and MS Excel™ get downloaded either individually or together as a combination.

What has been discovered is that by investigating each application on a file-by-file basis, some files are determined to be very important, i.e., occurring in a high percentage of applications. Without the present embodiment, the files occurring in two applications get downloaded twice. Considering one hundred (100) SW applications, it may be discovered that certain files occur within ninety percent (90%) of the SW applications being downloaded by the computer manufacturing process.

One method for selecting candidates for inclusion in the statistical file preload involves statistically analyzing what files would typically go into software downloads. In other words, the present process determines what files are statistically downloaded with highest frequency or with a prescribed threshold frequency. In addition, a statistical weighting function characterizes each file on a bit-per-bit basis, as consuming a certain amount of network bandwidth (i.e., costs a certain amount of money) with respect to other download files.

SW applications comprise an accumulation of files. Each file is then characterized on a bit-by-bit basis, for example, as requiring a given download bandwidth. Select files are then used to make up the statistical file preload image of the hard drives used in the computer manufacturing process.

The greater the weighting score attributed to a particular file, as statistically characterized, then the higher the likelihood that the given file will be included in the statistical file preload image. For purpose of illustration, we assume that all files of all applications offered by the computer manufacturer cannot physically (or otherwise) be preloaded onto a hard drive or storage device. Accordingly, a selection of which files cannot be included in the preload image must be rendered. The characterizing of files becomes a function of ascertaining a cost of each file on a bit-per-bit basis with respect to the overall computer manufacturing process. The present embodiments involve such a statistical selection approach.

On a particular target system, the cost associated with a given file may be zero since the given file may not actually get downloaded onto the particular target system. In the business sense, it is the amortized cost over a number of target systems which is important (e.g. the profit margin across all computer systems being manufactured during a given period of time).

Statically, a sample of every system that is being shipped for a given period of time is investigated. The results can be graphed on a bit-per-bit basis to illustrate cost in terms of bandwidth consumption (i.e., consuming an excessive amount of bandwidth or bandwidth above a prescribed threshold level).

In one embodiment, all files of the applications are statistically ordered (i.e., placed in a prescribed order or arrangement) based upon a prescribed weighting function value. In response to a decision of how large of an image to preload, the list of statistically ordered files is selectively edited to remove the least significant files. Accordingly, the remainder of ordered files represent a collection of most significant files that make up the statistically preload image and size. In other words, all files are ordered by weight (or value) according to a statistical analysis of each file. The most expensive files are placed at the top of the list and the least expensive files are placed at the bottom.

Another parameter includes hard drive storage size. For example, the hard drive vendor may be able to place a preload image of a prescribed size onto the hard drives supplied to the manufacturer without additional capital investment. For example, the vendor's capability may be limited to a 4 Gbyte preload image without needing additional capital investment. However, if the manufacturer desires a 5 Gbyte preload image, then the hard drive vendor would require additional capital investment to supply the hard drives with a 5 Gbyte preload image.

The above issue of hard drive vendor preload image capability is important in that the cost to implement the preload image must be less than the amount of money saved in the factory to render this solution acceptable. Accordingly, the size of the preload image is a function of capabilities of the hard drive vendor with respect to placing a preload image onto the supplied hard drives at little or no significant additional cost to the computer manufacturer.

Viewed another way, preload image size is a function of the largest capacity that can reasonably and economically be installed for the preload image. The largest capacity is a minimum of i) the physical capacity of the hard drive or ii) the hard drive vendor's capability to load the preload image at minimal additional expense. Other parameters may also be considered that limit the maximum size of the preload image. For example, in a situation where no preload image is provided by the hard drive vendor, a preprocessing station may reside within the computer manufacturer for preprocessing hard drives supplied by the hard drive vendor to place the preload image onto hard drives. The preprocessing station may be of limited capacity for preloading a preload image up to a predetermined maximum size onto hard drives, prior to actual installation of the hard drives into target computer systems. Accordingly, the preprocessing station can reside at the hard drive vendor or at the computer manufacturer.

The preload image of the present embodiments is a non-differentiated image. Accordingly, every hard drive or storage device for a given line of business which is supplied to the factory containing the preload image looks essentially the same. It is the statistical choice of the files in the preload image that makes such a non-differentiated image powerful. In contrast, other approaches to preloaded images for uniquely configuring the hard drives of computer systems may include downloading across the manufacturing network an exact image for each hard drive to be installed in a target system; however, such an exact image preload is a different process, and is likely to be more costly, than that of the present embodiments. Accordingly, the present embodiments differ from a method which preloads a differentiated image for every hard drive.

The present embodiments include a method for statistically selecting files for inclusion into a hard drive or storage device preload image. Files which are common to more than one SW application are included only once in the preload image. As a result, a certain level of compression is obtained.

During a differentiation portion of the computer manufacturing process, a desired file contained in the preload image can be advantageously obtained from the local storage of the hard drive, in comparison to obtaining the desired file over the manufacturing server network. If additional copies of the desired file are needed during the differentiation, copies are made from the hard drive and not via the network. Accordingly, with the statically weighted and selected files of the preload image, those files determined most expensive to the manufacturing process are resident on the hard drive or storage device, relieving the network of a corresponding burden. Recall that the more expensive a bit is over the manufacturing network (cost per bit per file), the more likely that bit will be selected for inclusion in the preloaded image. Retrieval of files from local storage (i.e., the hard drive of a target system) is also much faster than retrieval of files from remote storage of the network.

With the use of statistical analysis, files that are common among the numerous applications used in the computer manufacturing process are identified and ordered according to a prescribed weighting. As discussed, some common files are more important than other common files on a bit-per-bit basis. For example, each common file is weighted according to a business cost associated with a respective file. The more expensive a bit costs to download across the network, the higher the probability that the associate file will be included into the preloaded image.

The present embodiments accordingly have a greater significance to the overall manufacturing process than with respect to impact upon an individual target computer system. From a statistical point of view, changes implemented according to the embodiments of the present disclosure impact the manufacturing process in a significant manner. Changes to the statistical file selection algorithm directly impacts how much bandwidth there is on the manufacturing software download server and how much time it will take to perform a SW download on any given target computer system.

To further illustrate, let us consider a file F1 and determine its cost. Assume that there are one hundred (100) applications on the manufacturing network that a customer can choose from. Let's assume that file F1 is contained in three (3) of the one hundred (100) applications and that all three of those applications are downloaded onto one percent (1%) of all target systems. Now, assume that there is another file F2 and that file F2 is contained in ten (10) of the one hundred (100) applications. Further, assume that the 10 applications containing file F2 are downloaded on ten percent (10%) of all target systems. In this example, the cost of file F2 is much more than the cost of file F1, because file F2 is downloaded across the network many more times on a statistical basis than file F1.

Now let's consider yet another example. Assume that there are one hundred (100) total applications on the manufacturing network that a customer can choose from. Assume that a file F3 appears in ten (10) of the one hundred (100) applications and that the ten (10) applications are downloaded on one percent (1%) of all target computer systems. In addition, assume that 10 of the one hundred (100) applications contain file F4 and that the corresponding 10 applications are downloaded on one percent (1%) of all target computer systems. Further assume that the size of file F3 is 1 KB and file F4 is 1 MB. Consider now the preload image. Assume that the preload image is of a certain size such that a single file or a number of files (1 to N) may be loaded into the preload image.

On a bit per bit basis, the cost of file F3 alone and the cost of file F4 alone is the same. However, if we now consider the time it takes to access and get a new file handle on the network in comparison to the time it takes to access and get a new file handle locally (i.e., on the target system), it may be discovered that it takes a lot longer to get a file, or simply get a pointer to the file, off the network than from the local storage of the hard drive. If there are many files to be downloaded off the network for a total of 1 MB, then merely getting access to all of the files will consume a certain amount of time. As indicated, access time is a measure of time needed to get to a file (or files) in preparation for the download. The cumulative amount of time needed to get access to the many files will be significantly greater that the amount of time needed to get access to a single file of 1 MB. Accordingly, access time, and not just download time of a file or files, needs to be considered.

Adding access time to the statistical weighting function may result in small size files being added to the preload image preferentially over larger size files. Accordingly, numerous small size files could be put onto the local storage via the preload image, because access (by getting the name and pointer) to such small files can be accomplished much more quickly via local storage than over the network. In this example, the statistical weighting function would include a preference for small files over large files. The total cost for a file in this instance is download time plus file access time. Download time for a file is essentially the size of the file divided by the bandwidth (BW). Access time is substantially constant. In this example, the weighting function includes both statistical and non-statistical parameters.

Accordingly, in response to a determination that a particular characteristic of a file costs more to download via the network than via local storage, then that characteristic can be considered for inclusion as part of the statistical weighting function. A reordering of which files to include in the preload image may also be performed based upon a revised analysis.

The criteria used for the statistical weighting becomes more and more granular as the criteria becomes important with respect to cost per bit across the manufacturing network. If a cost savings can be established, then such a criteria responsible for the cost savings is a suitable candidate for inclusion in the statistical weighting function. Appropriate statistical calculations can be performed off-line. In addition, the statistical calculations can be performed once-a-day for determining the preload image for the next shift or next preload image update.

To further illustrate, consider for example a prescribed amount of space within the preload image (e.g. 1 MB of space). A single 1 MB file can result in a savings of the download time of the 1 MB file plus an access time associated with the download of the 1 MB file. However, in the case of one thousand (1,000) 1 KB files, a saving of the download of 1 MB of files plus 1,000 accesses is possible. Accordingly, in this example, if a significant number of small size files are frequently used, then it may be much less expensive with respect to the manufacturing process to keep the numerous small files in the preload image than on the network. In this instance, savings are reflected in terms of the number of accesses that would be required if the 1,000 1 KB files were downloaded to target systems across the network.

While the above discussion includes total number of applications, number of common files, percentage occurrence that the given application ends up on a target computer system, and file size, it should be noted that other variables may be used as selection criteria in the selecting of files for inclusion in the statistical file preload image. Each file of an application has a prescribed amount of overhead associated with it. Accordingly, the statistical and weighting function selection criteria are adjusted as needed for the characteristics of a particular computer system manufacturing implementation.

Yet another criteria for consideration in the statistical file preload of the present embodiments is a preload image lead time factor (also referred to herein as a latency factor). This preload image lead time factor can be explained with the assistance of the following example. On any given day, certain software is downloaded in the factory. Software download history is used to generate the statistical analysis for selection of files to include in the preload image. The history includes past data such as yesterday's data, last week's data, or older. The importance of lead time is that if the hard drive vendor preloads an image for the manufacturer, it may be four weeks (or some other amount of time) from the time a hard drive leaves the hard drive vendor and arrives at the computer manufacturer. As a result, by the time the preload image reaches the factory, the preload image may have aged. The latency (or age) of a preload image and its impact upon the manufacturing process are to be considered. For example, lead times may include 4, 2, 1, or 0 weeks, or other duration.

Still yet another criteria is a predicted take rate criteria. For example, if it is known that a new product is to be offered and the marketing group of the computer manufacturer predicts a prescribed take rate for that new product, on a system-by-system basis, then a statistical file preload value can be attributed to the files associated with the new product.

Accordingly, the computer manufacturing process can be prepared in advance for a future product transition, whether for a new product being introduced or an older product being phased out. Using a predicted take rate as additional criteria assists in rendering the preload image more closely to the given manufacturing process. That is, the statistical file preload image, based in part on projected take rates, can anticipate demand in the factory. Accordingly, the predicted take rate is also applicable for determining a value of the files that are downloaded over the manufacturing network.

In the above discussion, emphasis has been placed upon files of applications. Note however, the methods of the present embodiments are also applicable to blocks of bits. Whether files or blocks of bits, a suitable server (or servers) is (are) used in the SW download process to handle downloading of the same. With respect to blocks, the blocks may be of different lengths, i.e., of constant and/or non-uniform length. A block can be described as an addressable quantity of bits of a prescribed length, where the length may be variable per a given format. In one embodiment, a block is 512 bytes. In another embodiment, the blocks are all the same length and delivery of the same operates at high efficiency. Blocks can be useful in the context where different files have one or more identical blocks contained therein.

The choice of file and/or block is selected in accordance with a prescribed granularity that best satisfies the particular manufacturing needs of the computer manufacturer. Software delivery systems also play a role in choosing between files and/or blocks. For example, it is desirable to make use of commercially available file server equipment in contrast to having to write code for a custom file server. It is less expensive to make use of commercially available delivery systems in the manufacturing process.

The embodiments of the present disclosure accordingly provide an estimate with respect to how much it will cost (e.g., in terms of bandwidth and overhead) to download a given file (or block) across the network onto a target computer system.

As discussed herein, an undifferentiated image is a non-unique image. The statistical file preload image is an undifferentiated image that gets preloaded onto a hard drive. However, in the context of custom configured computer systems, every customer may not desire the same image with a respective computer system. Accordingly, the preloaded image is differentiated to be unique for a given customer order during the SW download portion of the manufacturing process, subsequent to a hard drive installation into the target system.

The software image on a hard drive does not become unique to the target system until the SW download portion of the manufacturing process. With the present embodiments, the software image starts out as undifferentiated and then becomes differentiated upon a recomposition of the downloaded files with desired files of the preloaded image. The hard drive with the differentiated software image is what becomes the identity of the target system.

The differentiated software image comprises a number of unique files. The method of determining whether a file is unique is by its signature. File names alone are generally not unique enough. For instance, a particular file may be named "file number one" today and next week that same file name "file number one" may be used for a new version of the same file. File signatures are unique to a respective file, specific to the exact bits in the file.

Generally, file signatures are computed via a prescribed signature computation algorithm. Based upon the bits contained within a given file, a unique signature is calculated. Accordingly, if presented with two files having the same file name, then the signatures for each can be computed to determine more accurately which file is the desired file. If a single bit is changed within a file, then the modified file will have a signature that is different from the original file.

In the manufacturing process, signatures are used as keys for reference to respective files. In one embodiment of the present disclosure, a file is characterized by a file name and a corresponding signature. The file name and corresponding signature form a duple.

For instance, given an application Al, application Al has a list of file names associated with it. As mentioned above, it is insufficient to only know the file names to render the present embodiments operable. It is necessary to also know the exact state of all bits, i.e., the file signature. The file name enables an operating system and human operators a way of generally identifying the files, whereas the signatures enable unique identification of a respective file by the manufacturing server. The statistical file preload method of the present disclosure accordingly uses the file signature to determine which files, as identified by respective signatures, get downloaded the most in the manufacturing process.

In the manufacturing process, a part number generally points to an installation of an entire application. Part number signatures represent a list of signatures associated with a given part number. preload image signatures represent a list of signatures associated with an entire preload image being preloaded.

Figure 4:
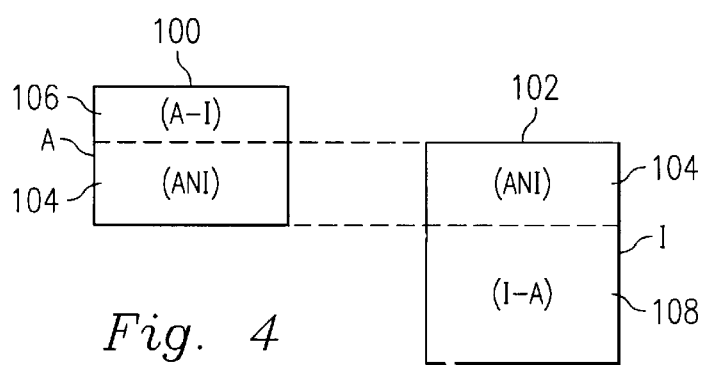
FIG. 4 is an illustrative view of an application to be downloaded in conjunction with the statistical file preload image according to the embodiments of the present disclosure.

Referring briefly to FIG. 4, consider application A (identified by reference numeral 100) that contains a first list of signatures. A preloaded image 102 contains a second list of signatures. The second list of signatures represent those files already preloaded onto the hard drive. Signatures common to both application A and the preload image I are represented by the intersection of A and I (A∩I) at 104. Signatures that are needed by application A, but that are not yet loaded onto the hard drive, are presented by the set (A-I) at 106. Lastly, signatures that are in the preload image I, but that are not needed by application A, are represented by the set (I-A) at 108. Accordingly, for the non-differentiated image, at least with respect to application A, the set (A∩I) at 104 will be in the preload image 102. The signatures of the set (A-I) at 106 identify which files get downloaded across the network and the signatures of the set (I-A) at 102 will be deleted to render the hard drive image differentiated.

The above illustration is representative of one part number, i.e., application A. The set (A∩I) is kept on the hard drive of the target system. The set (A-I) is downloaded onto the target system. Lastly, the set (I-A) is deleted (i.e., removed). The resultant image on the hard drive becomes the differentiated image. Similar treatment is given to other part numbers as well.

In one embodiment, the manufacturing process includes deciding upon what files to keep on the hard drive (A∩I), deleting those files not needed to be kept on the hard drive (I-A), and then downloading those files not yet on the hard drive (A-I). When dealing with multiple applications for a given target system, the method includes deciding upon which files are to remain on the hard drive, deleting un-needed files, and thereafter downloading needed files for all required applications together. In this manner, unintentional or accidental deletions are minimized for other applications of the differentiated image. This process constitutes active differentiation according to one embodiment of the present disclosure per target computer system. In another embodiment, the preload image consumes an entire hard drive.

During the manufacturing process for a given target computer system, a list of all applications to be part of the computer system is per customer order. Based upon the list of applications and the list of files already part of the preloaded image, decisions are made as to what files will be downloaded, decisions are made as to what files are to be kept, and decisions about what files are to be deleted are made based upon all of the applications for a given target system at one time. Once it is known what needs to be done for a particular target system, unneeded files are deleted and needed files not already present in the preload image are downloaded. In addition, to handle file redundancies, some files may need to exist on more than one place on the target system hard drive. In such instances, duplicate copies are made as needed during the differentiation portion of the manufacturing process, preferably from the local storage.

Once all files by signature are on the target system hard drive, the files are renamed as appropriate such that the files can be recognized by the operating system. As discussed, a file name and signature form a duple representation of a given file. Once files are stored onto a respective hard drive by signature, the duple representation is used to rename a respective file with its file name.

As discussed, the preload image contains files with signatures. A given signature may have more than one file name. Action lists are used during conversion of signatures into respective fully qualified file names. Fully qualified file names represent files and their respective location on the hard drive. The file identified by a given signature may need to appear in more than one location on the hard drive of a target system. For example, D:\Dir\f1.txt and D:\WINDOWS\f1.txt are two fully qualified file names for the file f1.txt designated by a single signature. The differentiated image will include two copies of the file f1.txt, however, only one copy of the file designated by the signature will appear in the preload image or be downloaded via the network. Multiple copies of a given file are preferably generated from a local copy, that is, from the target system hard drive once a first copy is provided. This is in contrast to downloading of multiple copies of a file across the network or having multiple copies of the desired file in the preload image.

Further as discussed herein, latency is a measure of lead-time needed from when an image is preloaded onto a hard drive to when the hard drive is at the factory ready to be installed into a target computer system. If the lead-time is approximately four weeks, then any given hard drive at the factory will have a preload image that is at least four weeks old. If the preload image is changed on a weekly basis, then those changes will not appear on hard drives in the factory for four weeks. The effect of latency is that as time passes, the dated preload image becomes less and less useful and accordingly renders the manufacturing process as requiring more and more network resources. For example, a new product transition can cause a preload image to become obsolete.

Factors which influence latency can be investigated and remedied in a manner most useful for a given manufacturing situation. For example, factors to consider are software download performance at the factory, hard drive vendor capability to preload an image onto a hard drive (e.g., limited to 1 GB), and any other data that may be helpful to illustrate advantages of a particular preload image characteristic (e.g., static image, latency of 4 weeks, 2 weeks, 1 weeks, and 0 weeks, percentage download of files across the network, etc.). As latency increases, the penalties in terms of percentage of files downloaded across the network increases. As latency is reduced, the percentage of files downloaded across the network is potentially reduced. It is desired to select those factors which minimize and/or reduce adverse impact on network resources. Minimizing adverse impact on network resources is especially helpful when considering product transitions, whether introducing a new hardware component or application or phasing out an older model hardware component or older software application.

Two dominant factors which influence the present embodiments include 1) age of the preload image and 2) size of the preload image. To assist in choosing a threshold, one can investigate the percentage download across the network versus preload image size. Other factors include looking at efficiencies. A measure of efficiency can be characterized by the following equation:

$$E = 1 - \left(\frac{\text{Size of Download in Bits (DL)}}{\text{Total Number of Bits of Differentiated Image (DI)}}\right)$$

For a most efficient process, it is desired to keep DL as small as possible. Least efficiency occurs when DL is a maximum (i.e., when the download includes all files to a target system via the network). For example, if at differentiation, it was necessary to download 100% of the bits needed for a given target system, then the efficiency would be zero.

The present embodiments accordingly utilize an analysis of one or more of the following which include a history of downloaded files, the downloaded files, installation files, and a predicted take rate of new applications. In one embodiment, the analysis determines which software/installation files consume the most bandwidth in the factory download process Upon a determination and identification of those files consuming the majority of bandwidth, a preloader system (whether located at the hard drive vendor site or at the computer system manufacturing site) preloads an image containing select ones of those files to the hard drive prior to a software download phase of the manufacturing process. The select files make up a statistical file preload list.

As discussed, in addition to bandwidth, other weighting factors are used in the selection of files to be included in the statistical file preload list. The other weighting factors include historical data, projected future take rates, applications in development, file size, recomposition overhead, take rate, proprietary nature of the file, file location, legal limitations, contractual obligations, inclusion in one or more logical associations of files such as membership in an application or group of applications or operating system, and other suitable criteria. Projected future take rates are determined as appropriate, e.g., via statistical projections, in the context of introduction of a new software application to the marketplace and/or phase out of a legacy product or software application.

The method of statistical preloading an image of the present embodiments facilitates and allows a single, undifferentiated image to be placed on the hard drive (or storage device) of a target computer system prior to the hard drive being installed within the target computer system. Statistical file preloading in this manner accomplishes a prescribed advance portion of the download, rendering the process of differentiating the image on the hard drive with respect to the specific target system cost effective and efficient.

An exemplary file, characterized as consuming a relatively high bandwidth (i.e., large bandwidth consumption), may include a dynamic link library (DLL). Such a DLL might be shared by a number of applications and, potentially, several operating systems. During a serial download of the operating system and applications, with a prior manufacturing process the same DLL may be downloaded across the manufacturing network several times for a particular target computer system being manufactured.

Another exemplary file, characterized as undesirably consuming excess bandwidth, may include a file that is required as part of the factory installation infrastructure. In prior manufacturing processes, the latter file might be downloaded for every software package installed on a target computer system.

Upon rendering a statistical file preload image for target computer systems according to the present embodiments, the network download system of the manufacturing process need only download the files that could not be included in the preload image for a given target computer system.

For example, suitable arrangements may be made for a hard drive vendor to commit to preloading a 4 GB image on the hard drives supplied by that vendor. The vendor, however, may be unable to load larger images due to the additional time required in the vendor's manufacturing process and/or environment. If the entire address space of all files that are downloadable in the factory exceeded (or were greater than) for example 4 GB, then relatively low bandwidth consumption files that could not be included within the preload image would need to be downloaded to complete the factory download/install for a given target computer system. Relatively low bandwidth consumption files are those files characterized as consuming small percentages of bandwidth in the software download portion of the manufacturing process.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A system apparatus comprising:

a storage device;

means for generating a system descriptor record;

means for assembling hardware in accordance with the system descriptor record, the storage device having a statistical file preload image including a list of files identified by file names and corresponding signatures;

means for statistically analyzing a bandwidth requirement of computer readable files to be downloaded to a target computer during a software download portion of a computer manufacturing process;

means for ordering the files into an ordered list of files as a function of the analyzed bandwidth requirements;

means for selecting files from the ordered list of files for inclusion in the preload image as a function of a prescribed manufacturing criteria;

a difference image downloaded to the storage device, the difference image being a function of the difference between an image of software in accordance with the system descriptor record and the preload image; and means for combining the difference image with the preload image according to recomposition instructions for installing a resultant image on the storage device of the system.

2. A computer comprising:

a processor; and a storage accessible by said processor, said storage including a statistical file preload image, the statistical file preload image formed by a process of:
- a.) statistically analyzing a bandwidth requirement of computer readable files to be downloaded to a target computer during a software download portion of a computer manufacturing process,
- b.) ordering the files into an ordered list of files as a function of the analyzed bandwidth requirements, and
- c.) selecting files from the ordered list of files for inclusion in the preload image as a function of a prescribed manufacturing criteria;

means for downloading a difference image to the storage, the downloaded image being a function of the difference between an image of software in accordance with the system descriptor record and the preload image; and means for combining the downloaded image with the preload image according to recomposition instructions for installing a resultant image on the storage device of the computer system.

3. A manufacturing method for producing a computer system comprising:

obtaining an order;

generating a system descriptor record in response to the order;

assembling hardware in accordance with the system descriptor record, the hardware including a storage device, the storage device having a statistical file preload image including a list of files, the list of files identified by file names and corresponding signatures, the statistical file preload image including an image formed by a process of:
- a.) statistically analyzing a bandwidth requirement of computer readable files to be downloaded to a target computer during a software download portion of a computer manufacturing process,
- b.) ordering the files into an ordered list of files as a function of the analyzed bandwidth requirements, and
- c.) selecting files from the ordered list of files for inclusion in the preload image as a function of a prescribed manufacturing criteria;

downloading a difference image to the storage device, the downloaded image being a function of the difference between an image of software in accordance with the system descriptor record and the preload image; and combining the downloaded image with the preload image according to recomposition instructions for installing a resultant image on the storage device of the computer system.

4. A system for manufacturing a computer comprising:

a front end processor for obtaining an order, the front end processor generating build instructions and a system descriptor record in response to the order;

download prep means for preparing a download image and recomposition instructions as a function of the system descriptor record, files, preload image signatures, and part number signatures;

means for assembling hardware components according to the build instructions, the hardware components including a storage device having a preload image thereon, the preload image including a statistical file preload image including a list of files, the list of files identified by file names and corresponding signatures, the statistical file preload image including an image formed by a process of:
- a.) statistically analyzing a bandwidth requirement of computer readable files to be downloaded to a target computer during a software download portion of a computer manufacturing process,
- b.) ordering the files into an ordered list of files as a function of the analyzed bandwidth requirements, and
- c.) selecting files from the ordered list of files for inclusion in the preload image as a function of a prescribed manufacturing criteria;

means for downloading a difference image to the storage device, the downloaded image being a function of the difference between an image of software in accordance with the system descriptor record and the preload image;

software vendor package decomposition means for decomposing at least one install application from a software vendor and generating at least one file and part number signature for a corresponding install application; and a signature database of part number signatures and preload image signatures.

5. The system of claim 4, further comprising:

means for combining the downloaded image with the preload image according to re-composition instructions for installing a resultant image on the storage device of the computer.

* * * * *